US009992402B2

United States Patent
Suzuki

(10) Patent No.: US 9,992,402 B2
(45) Date of Patent: Jun. 5, 2018

(54) IMAGING APPARATUS AND IMAGING CONTROL APPARATUS HAVING SYNCHRONOUS TYPE WIRELESS COMMUNICATION FUNCTION

(71) Applicant: CASIO COMPUTER CO., LTD., Shibuya-ku, Tokyo (JP)

(72) Inventor: Hiroshi Suzuki, Akiruno (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days. days.

(21) Appl. No.: 15/173,449

(22) Filed: Jun. 3, 2016

(65) Prior Publication Data

US 2017/0078554 A1  Mar. 16, 2017

(30) Foreign Application Priority Data

Sep. 11, 2015  (JP) ................................. 2015-179276

(51) Int. Cl.
*H04N 7/173*  (2011.01)
*H04N 5/232*  (2006.01)
(Continued)

(52) U.S. Cl.
CPC ........ *H04N 5/23206* (2013.01); *H04H 20/38* (2013.01); *H04N 5/23245* (2013.01);
(Continued)

(58) Field of Classification Search
CPC ........... H04N 5/23206; H04N 5/23245; H04N 5/247; H04W 56/002; H04W 4/008; H04H 20/38
See application file for complete search history.

(56) References Cited

U.S. PATENT DOCUMENTS 9,253,389 B2  2/2016  Muraki et al.
2005/0151852 A1*  7/2005  Jomppanen .......... H04N 5/0733
348/218.1
(Continued)

FOREIGN PATENT DOCUMENTS

JP  2011050017 A  3/2011
JP  2013225826 A  10/2013
(Continued)

OTHER PUBLICATIONS

Japanese Office Action dated Aug. 1, 2017 issued in counterpart Japanese Application No. 2015-179276.

*Primary Examiner* — Lin Ye
*Assistant Examiner* — John H Morehead, III
(74) *Attorney, Agent, or Firm* — Holtz, Holtz & Volek PC

(57) ABSTRACT

The present invention is to perform synchronous shooting using synchronous type wireless communication more effectively. An imaging apparatus 1 includes: a synchronous communication unit M1 configured to perform synchronous type wireless communication to send/receive data in a communication synchronized state in which a communication clock of a communication partner and an own communication clock are synchronized; a synchronous communication control unit M2 configured to make a transition to the communication synchronized state to perform the synchronous type wireless communication with other imaging apparatuses that are to perform synchronous shooting; a broadcast reception unit M4 configured to receive a broadcast wireless signal transmitted to plural imaging apparatuses in the communication synchronized state; and a first control unit 104*a* configured to perform shooting at timing when the broadcast wireless signal is received.

22 Claims, 5 Drawing Sheets

(51) Int. Cl.
*H04H 20/38* (2008.01)
*H04W 56/00* (2009.01)
*H04W 4/00* (2018.01)
*H04N 5/247* (2006.01)

(52) U.S. Cl.
CPC ............ *H04N 5/247* (2013.01); *H04W 4/008* (2013.01); *H04W 56/002* (2013.01)

(56) References Cited

U.S. PATENT DOCUMENTS

| | | | |
|---|---|---|---|
| 2009/0295919 A1* | 12/2009 | Chen | H04N 7/18 348/143 |
| 2011/0050925 A1 | 3/2011 | Watanabe | |
| 2013/0201357 A1 | 8/2013 | Watanabe | |
| 2013/0242135 A1 | 9/2013 | Muraki et al. | |
| 2014/0002664 A1 | 1/2014 | Hanabusa | |
| 2014/0094198 A1* | 4/2014 | Heo | H04W 52/0274 455/456.4 |
| 2015/0012308 A1* | 1/2015 | Snyder | G06Q 10/02 705/5 |
| 2016/0094773 A1* | 3/2016 | Maciuca | H04N 5/23206 348/207.11 |

FOREIGN PATENT DOCUMENTS

| | | |
|---|---|---|
| JP | 2014011529 A | 1/2014 |
| JP | 2014011633 A | 1/2014 |

\* cited by examiner

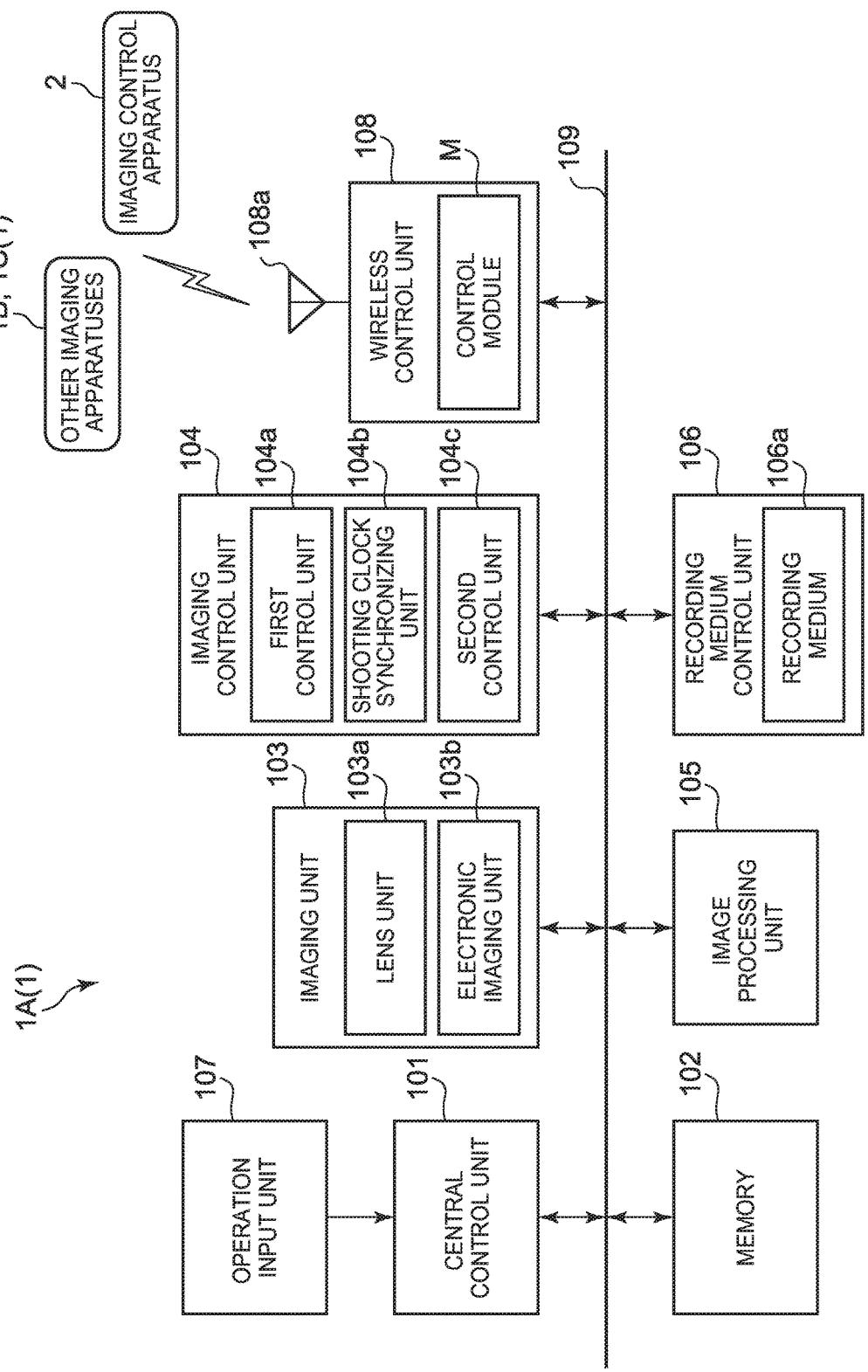

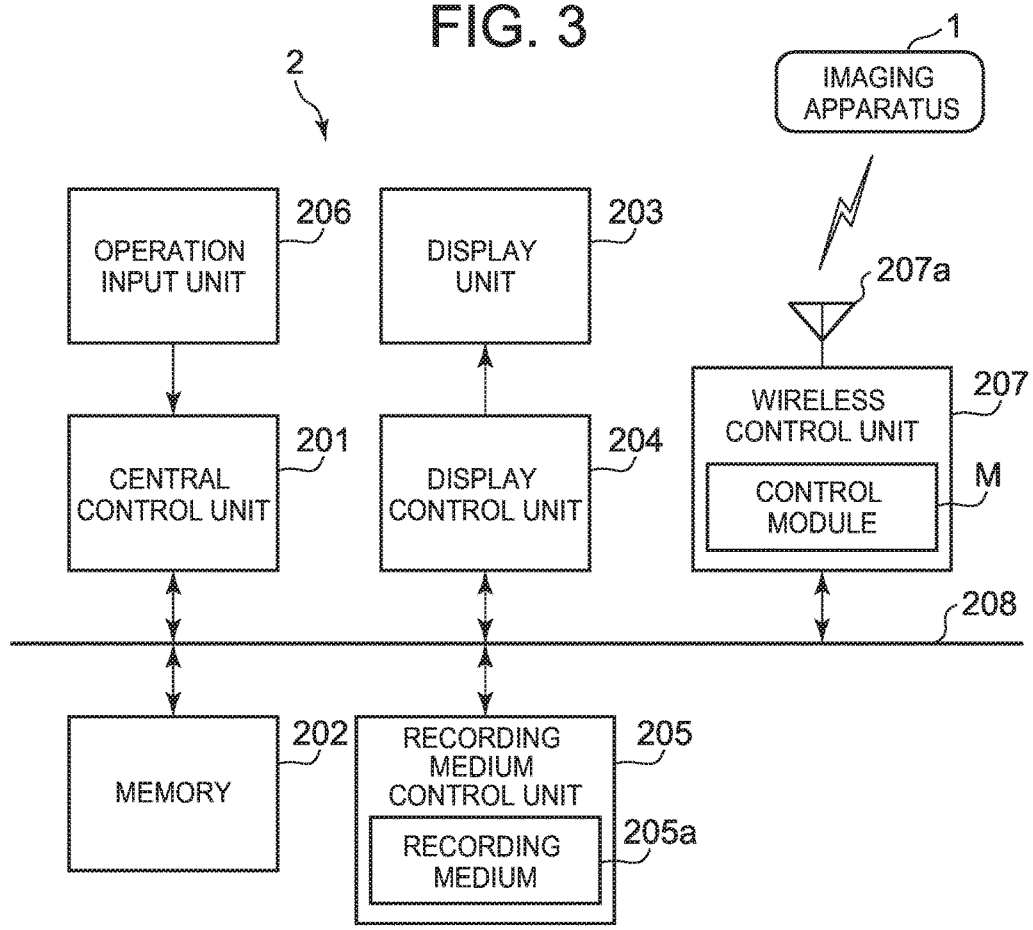
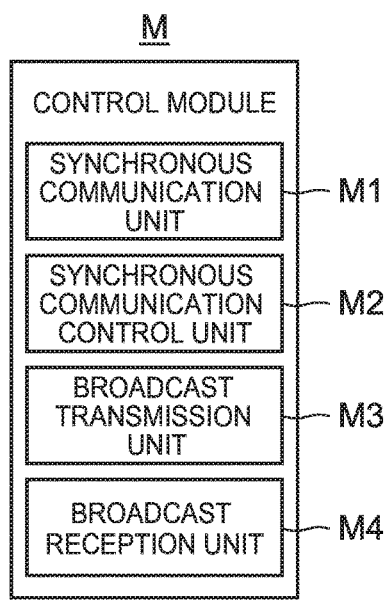

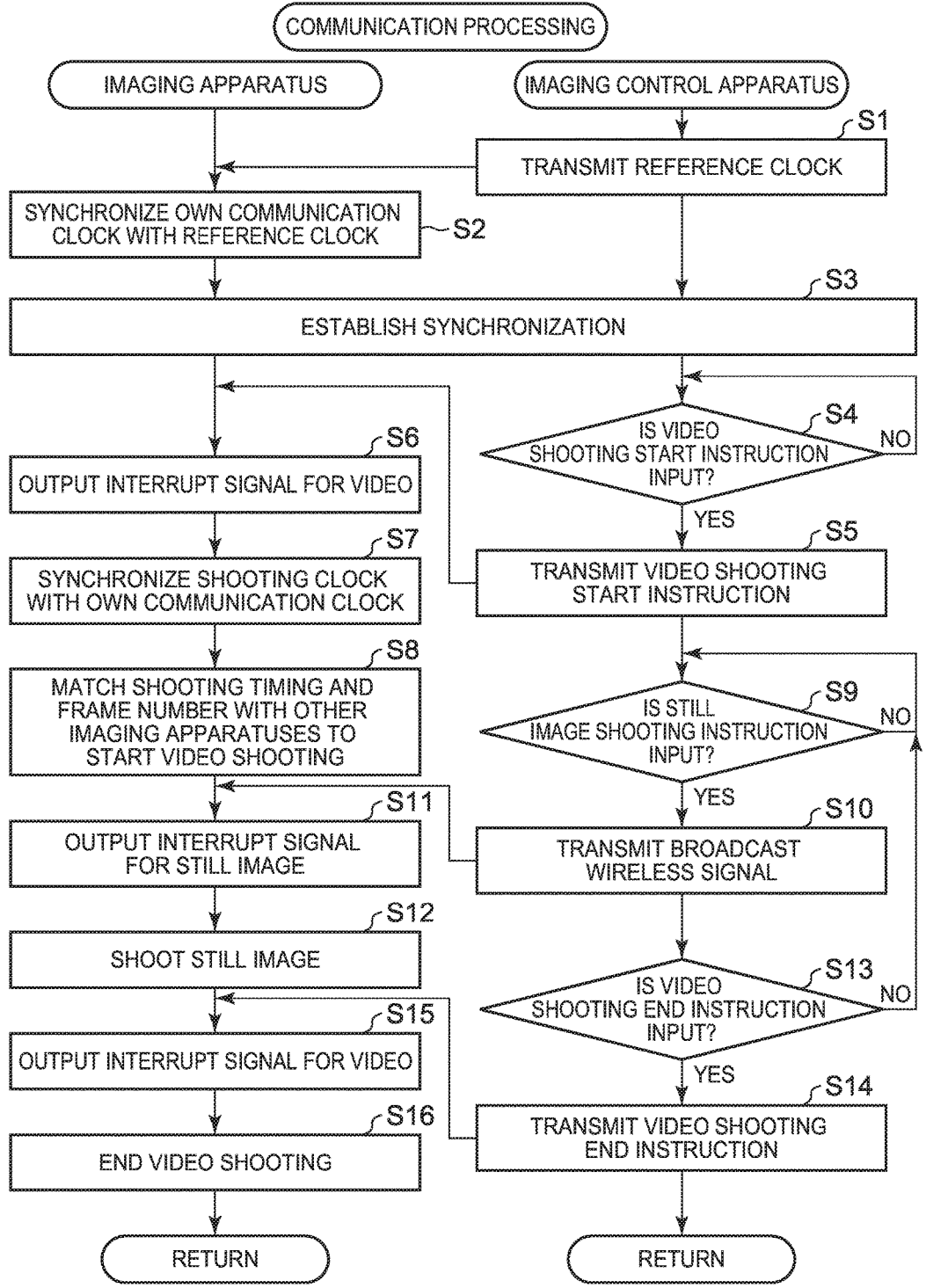

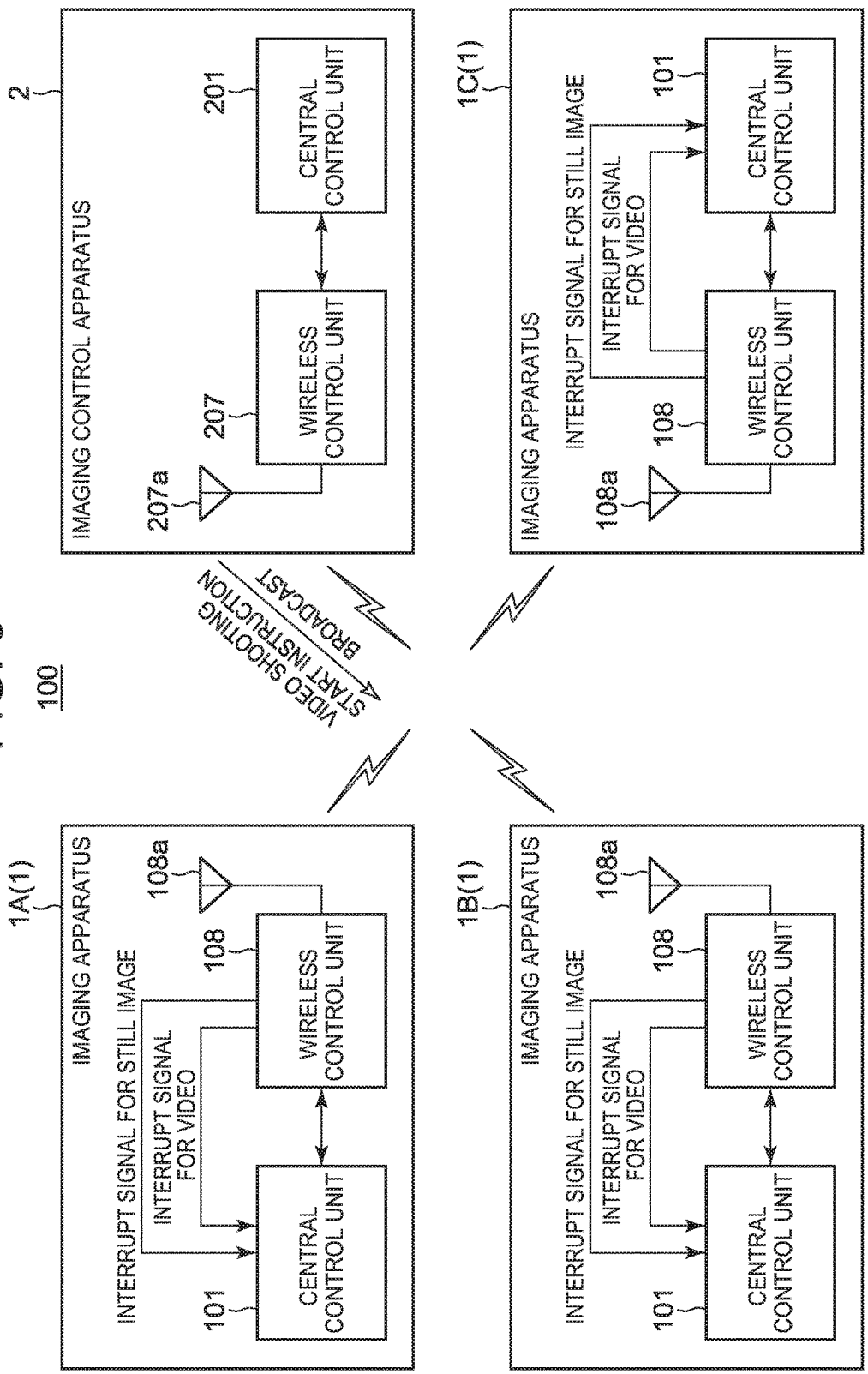

IMAGING APPARATUS AND IMAGING CONTROL APPARATUS HAVING SYNCHRONOUS TYPE WIRELESS COMMUNICATION FUNCTION

BACKGROUND OF THE INVENTION

1. Field of the Invention

The present invention relates to an imaging apparatus, an imaging control apparatus, an imaging method, an imaging control method, and a program.

2. Description of the Related Art

Conventionally, techniques have been known, in which plural imaging apparatuses perform synchronous type wireless communication operation to synchronize a shooting clock of each imaging apparatus using a communication clock synchronous with this communication operation so that the plural imaging apparatuses will perform synchronous shooting at timing of this synchronized shooting clock (for example, see Patent Documents 1 and 2).

[Patent Document 1] Japanese Patent Application Laid-Open No. 2014-11529

[Patent Document 2] Japanese Patent Application Laid-Open No. 2014-11633

However, in the cases of Patent Documents mentioned above, for example, there is a problem that use of a ring buffer or use of RTC time information is required to synchronize the shooting timings of the plural imaging apparatuses using the synchronous type wireless communication.

Therefore, it is an object of the present invention to provide an imaging apparatus, an imaging control apparatus, an imaging method, an imaging control method, and a program capable of performing synchronous shooting using synchronous type wireless communication more effectively.

SUMMARY OF THE INVENTION

In one aspect of the present invention, an imaging apparatus having a synchronous type wireless communication function includes an imaging unit including an image sensor, a control unit including a processor, and a wireless communication unit including a wireless circuit, wherein the wireless communication unit performs synchronous type wireless communication to send/receive data in a communication synchronized state in which a communication clock of a communication partner and an own communication clock are synchronized, and receives a broadcast wireless signal transmitted simultaneously to plural imaging apparatuses in the communication synchronized state, and the control unit makes a transition to the communication synchronized state to cause the wireless communication unit to perform wireless communication with other imaging apparatuses that are to perform synchronous shooting, and performs first shooting control to cause the imaging unit to perform shooting at timing when the broadcast wireless signal is received by the wireless communication unit.

In another aspect of the present invention, an imaging control apparatus having a synchronous type wireless communication function includes a control unit including a processor and a wireless communication unit including a wireless circuit, wherein the wireless communication unit performs synchronous type wireless communication to send/receive data in a communication synchronized state in which a communication clock of a communication partner and an own communication clock are synchronized, and the control unit makes a transition to the communication synchronized state to cause the wireless communication unit to perform wireless communication with plural imaging apparatuses, receives an instruction on synchronous shooting timing from any of the plural imaging apparatuses, and transmits a broadcast wireless signal to the plural imaging apparatuses in the communication synchronized state at this instructed shooting timing.

BRIEF DESCRIPTION OF THE SEVERAL VIEWS OF THE DRAWING

FIG. 2 is a block diagram illustrating a schematic configuration of each of imaging apparatuses that constitute the wireless synchronization system in FIG. 1.

FIG. 3 is a block diagram illustrating a schematic configuration of an imaging control apparatus that constitutes part of the wireless synchronization system in FIG. 1.

FIG. 4 is a block diagram illustrating a schematic configuration of a control module of a wireless control unit.

FIG. 5 is a flowchart illustrating an example of operation related to communication processing performed by the wireless synchronization system in FIG. 1.

FIG. 6 is a schematic diagram for describing the communication processing in FIG. 5.

DETAILED DESCRIPTION OF THE INVENTION

Figure 1:
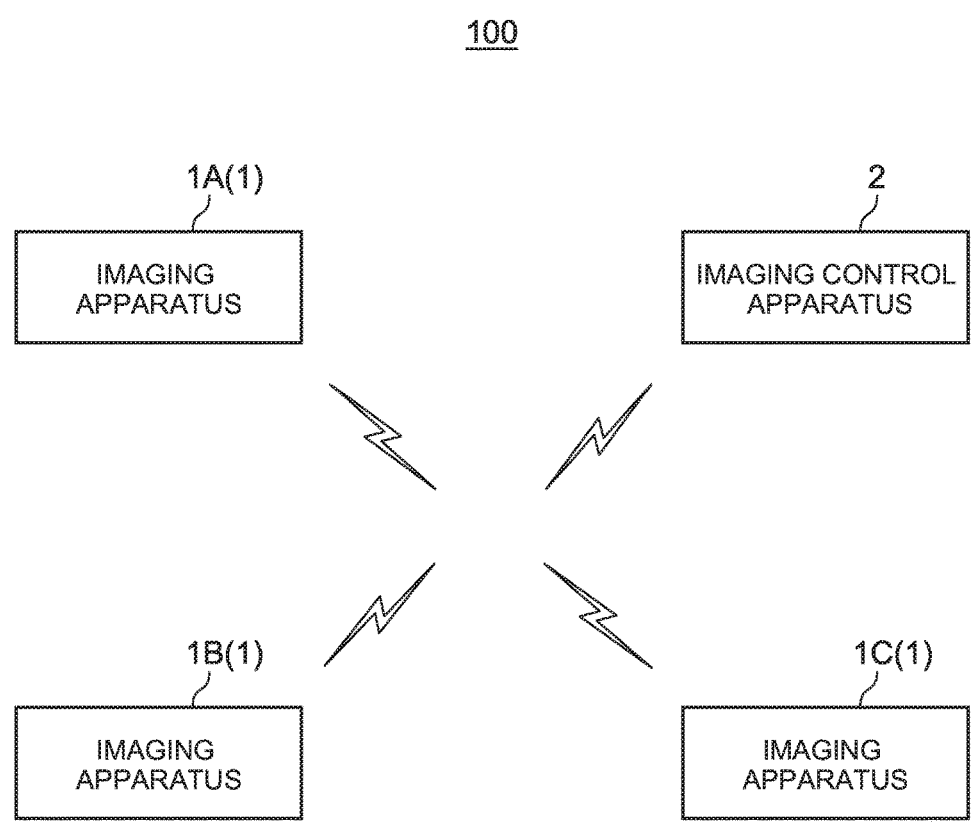
FIG. 1 is a diagram illustrating a schematic configuration of a wireless synchronization system of one embodiment to which the present invention is applied.

A specific aspect of the present invention will be described below with reference to the accompanying drawings. Note that the scope of the invention is not limited to the illustrated examples.

FIG. 1 is a diagram illustrating a schematic configuration of a wireless synchronization system 100 of one embodiment to which the present invention is applied.

As illustrated in FIG. 1, the wireless synchronization system 100 of the embodiment includes plural imaging apparatuses 1, . . . (three imaging apparatuses 1A to 1C are illustrated in FIG. 1) configured to perform synchronous type wireless communication (for example, Bluetooth (registered trademark) or the like), and an imaging control apparatus 2.

First, an imaging apparatus 1 will be described with reference to FIG. 2.

FIG. 2 is a block diagram illustrating a schematic configuration of the imaging apparatus 1.

Here, although the plural imaging apparatuses 1, . . . are slaves in the synchronous type wireless communication, since the configuration and operation thereof are the same, an imaging apparatus 1A will be representatively illustrated to describe the configuration. Note that all the imaging apparatuses 1 are not necessarily of the same type.

As illustrated in FIG. 2, the imaging apparatus 1A includes a central control unit 101, a memory 102, an imaging unit 103, an imaging control unit 104, an image processing unit 105, a recording medium control unit 106, an operation input unit 107, and a wireless control unit 108.

The central control unit 101, the memory 102, the imaging unit 103, the imaging control unit 104, the image processing unit 105, the recording medium control unit 106, and the wireless control unit 108 are connected through a bus line 109.

The central control unit 101 controls each of the units of the imaging apparatus 1A. Specifically, though not illustrated, the central control unit 101 includes a CPU (Central Processing Unit), a RAM (Random Access Memory), and a ROM (Read Only Memory) to perform various control operations according to various processing programs (not illustrated) for the imaging apparatus 1A.

The memory 102 is, for example, a DRAM (Dynamic Random Access Memory) or the like to temporarily record data processed by each unit of the imaging apparatus 1A in addition to the central control unit 101.

The imaging unit 103 constitutes imaging means configured to image a subject. Specifically, the imaging unit 103 includes a lens unit 103a and an electronic imaging unit 103b.

The lens unit 103a is composed of plural lenses such as a zoom lens and a focus lens.

The electronic imaging unit 103b is composed of an image sensor, such as a CCD (Charge Coupled Device) or a CMOS (Complementary Metal-Oxide Semiconductor), and the like to convert, to a two-dimensional image signal, an optical image passing through various lenses in the lens unit 103a.

Though not illustrated, the imaging unit 103 may also include an aperture diaphragm configured to adjust the amount of light passing through the lens unit 103a.

The imaging control unit 104 controls imaging of the subject by the imaging unit 103. In other words, the imaging control unit 104 includes a timing generator, a driver, and the like, not illustrated. Then, the imaging control unit 104 drives the electronic imaging unit 103b to scan by means of the timing generator and the driver to have the electronic imaging unit 103b convert, to the two-dimensional image signal, the optical image formed by the lens unit 103a for every predetermined period, read a frame image for every screen from an imaging area of the electronic imaging unit 103b, and output the frame image to the image processing unit 105.

The imaging control unit 104 is equipped with a first control unit 104a, a shooting clock synchronizing unit 104b, and a second control unit 104c.

The first control unit (first shooting control means) 104a controls shooting of a still image with the imaging unit 103.

In other words, the first control unit 104a causes the imaging unit 103 to perform shooting at the timing when a broadcast wireless signal transmitted from the imaging control apparatus 2 is received by the wireless control unit 108. Specifically, when the broadcast wireless signal is received by the wireless control unit 108, the wireless control unit 108 outputs, to the central control unit 101, an interrupt signal (first interrupt signal) for the still image synchronized with the transmission timing of this broadcast wireless signal in response to the reception of the broadcast wireless signal (see FIG. 6). When the interrupt signal for the still image output from the wireless control unit 108 is input, the central control unit 101 outputs, to the imaging control unit 104, a control signal to perform still image shooting processing as interrupt processing based on this interrupt signal for the still image. Then, the first control unit 104a of the imaging control unit 104 causes the imaging unit 103 to shoot the still image.

Since the above-mentioned still image shooting control is performed on all the imaging apparatuses 1, . . . , the shooting of the still image with the imaging unit 103 is performed in such a state that all the imaging apparatuses 1 are synchronized.

Further, the first control unit 104a performs still image shooting by either one method selected from a first still image shooting method and a second still image shooting method. The selection of this shooting method is made, for example, by a user performing a predetermined operation in advance on the imaging control apparatus 2, and in this case, a signal giving an instruction on the determined shooting method is wirelessly transmitted to all the imaging apparatuses 1.

Note that the selection of the shooting method may be made based on a predetermined operation on any one imaging apparatus 1 (for example, the imaging apparatus 1A, or the like) among the plural imaging apparatuses 1, . . . , and in this case, the signal giving the instruction on the determined shooting method is wirelessly transmitted to the other imaging apparatuses 1 (for example, the imaging apparatuses 1B, 1C, and the like) and the imaging control apparatus 2.

The first still image shooting method is a method by which, when a broadcast wireless signal is received by the wireless control unit 108, still image shooting is performed immediately as being instructed on the still image shooting with the imaging unit 103 irrespective of the content of this broadcast data.

Here, when the broadcast wireless signal is received by the wireless control unit 108, the first control unit 104a may perform still image shooting by the first still image shooting method on condition that predetermined requirements such as that a synchronous shooting mode is set in advance are satisfied.

The second still image shooting method is a method by which, when the broadcast wireless signal is received by the wireless control unit 108, the central control unit 101 determines whether the content of this broadcast data instructs the imaging unit 103 to perform still image shooting, and when it is to instruct the imaging unit 103 on the still image shooting, the still image shooting is performed.

Further, when receiving a broadcast wireless signal transmitted from the imaging control apparatus 2 during video shooting under the control of the second control unit 104c, the first control unit 104a performs still image shooting.

The shooting clock synchronizing unit (shooting clock synchronizing means) 104b synchronizes an own shooting clock with an own communication clock.

In other words, in a communication synchronized state where a communication clock of a communication partner and the own communication clock are synchronized, the wireless control unit 108 generates, from a reference clock, the own communication clock synchronous with the other imaging apparatuses 1 (for example, the imaging apparatuses 1B, 1C, and the like) at every predetermined interval (for example, 250 ms or the like). Then, the shooting clock synchronizing unit 104b uses the own communication clock generated by the wireless control unit 108 to generate the own shooting clock in order to synchronize the own shooting clock with the own communication clock.

The second control unit (second shooting control means) 104c controls video shooting with the imaging unit 103.

In other words, the second control unit 104c causes the imaging unit 103 to perform shooting in sync with the own shooting clock synchronized by the shooting clock synchronizing unit 104b with the own communication clock synchronous with the other imaging apparatuses 1 (for example, the imaging apparatuses 1B, 1C, and the like).

For example, when a video shooting start instruction transmitted from the imaging control apparatus 2 is received by the wireless control unit 108, the wireless control unit 108 outputs, to the central control unit 101, an interrupt signal (second interrupt signal) for a video synchronized with the transmission timing of this video shooting start instruction in response to the reception of the video shooting start instruction (see FIG. 6). When the interrupt signal for the video output from the wireless control unit 108 is input, the central control unit 101 outputs, to the imaging control unit 104, a control signal to perform video shooting processing as interrupt processing based on this interrupt signal for the video.

The second control unit 104c of the imaging control unit 104 causes the imaging unit 103 to start video shooting. Specifically, the second control unit 104c counts up each of shooting clocks synchronized by the shooting clock synchronizing unit 104b with each of own communication clocks to identify the frame number of each of frame images that constitute the video in order to generate a signal giving an instruction on the timing of matching the video frame number with the other imaging apparatuses 1 (for example, a signal giving an instruction on the 0th frame image). Then, the second control unit 104c outputs the generated signal to the wireless control unit 108, and the wireless control unit 108 transmits the input signal to the other imaging apparatuses 1 through the synchronous type wireless communication.

Since the above-mentioned video shooting control is performed on all the imaging apparatuses 1, . . . , the shooting of the video with the imaging unit 103 is performed in such a state that all the imaging apparatuses 1 are synchronized.

The image processing unit 105 generates image data on an image obtained by imaging a subject.

Specifically, the image processing unit 105 performs gain adjustment on an analog value signal of the frame image transferred from the electronic imaging unit 103b appropriately for each color component of RGB to be sampled and held in a sample/hold circuit (not illustrated) and converted to digital data at an A/D converter (not illustrated), and then performs color process processing including pixel interpolation and gamma correction in a color process circuit (not illustrated) to generate digital luminance signal Y and color difference signals Cb, Cr (YUV data).

When a live view image is displayed on the imaging control apparatus 2, the image processing unit 105 generates image data for the display of each of frame images that constitute the live view image, and outputs the image data to the wireless control unit 108. The wireless control unit 108 transmits the input image data to the imaging control apparatus 2 through a communication antenna 108a.

When an image is recorded, the image processing unit 105 compresses YUV data on a subject according to a predetermined coding system (such as JPEG format, Motion JPEG format, or MPEG format), and outputs the data to the recording medium control unit 106.

The recording medium control unit 106 includes a recording medium 106a in a removable manner to control data reading from a loaded recording medium 106a and data writing to the recording medium 106a.

In other words, the recording medium control unit 106 records, in a predetermined recording area of the recording medium 106a, image data to be recorded and coded by the image processing unit 105 in the predetermined compression format (such as JPEG format, Motion JPEG format, or MPEG format).

The recording medium 106a is, for example, a nonvolatile memory (flash memory) or the like.

The operation input unit 107 is used to perform predetermined operations on the imaging apparatus 1A.

Specifically, for example, the operation input unit 107 includes a power button for power on/off of the apparatus body, a shutter button related to a subject imaging instruction, select and OK buttons related to a selection instruction about an imaging mode or function, and the like (all of which are not illustrated).

Then, when any of various buttons is operated by a user, the operation input unit 107 outputs, to the central control unit 101, an operation instruction corresponding to the operated button. The central control unit 101 causes each unit to perform predetermined operation according to the input operation instruction output from the operation input unit 107.

The wireless control unit 108 performs communication control with external apparatuses (for example, the other imaging apparatuses 1, the imaging control apparatus 2, and the like) connected through a predetermined wireless communication line.

In other words, the wireless control unit 108 sends/receives data through synchronous type wireless communication (for example, Bluetooth or the like). For example, the wireless control unit 108 is equipped with a control module M (wireless circuit) to perform synchronous type wireless communication based on the Bluetooth communication standards with the external apparatuses through the communication antenna 108a.

The configuration of the control module M of the wireless control unit 108 will be described later (see FIG. 4).

Referring next to FIG. 3, the imaging control apparatus 2 will be described.

FIG. 3 is a block diagram illustrating a schematic configuration of the imaging control apparatus 2.

The imaging control apparatus 2 is a master in the synchronous type wireless communication. Specifically, as illustrated in FIG. 3, the imaging control apparatus 2 includes a central control unit 201, a memory 202, a display unit 203, a display control unit 204, a recording medium control unit 205, an operation input unit 206, a wireless control unit 207, and the like.

The central control unit 201, the memory 202, the display control unit 204, the recording medium control unit 205, and the wireless control unit 207 are connected through a bus line 208.

For example, the imaging control apparatus 2 may be a dedicated apparatus to deal with the imaging apparatuses 1, or may be a mobile phone, a smartphone, a PDA (Personal Data Assistants), or the like.

The central control unit 201 controls each unit of the imaging control apparatus 2. Specifically, though not illustrated, the central control unit 201 includes a CPU (Central Processing Unit), a RAM (Random Access Memory), and a ROM (Read Only Memory) to perform various control operations according to various processing programs (not illustrated) for the imaging control apparatus 2.

The memory 202 is, for example, a DRAM (Dynamic Random Access Memory) or the like to temporarily record data and the like to be processed by each unit of the imaging control apparatus 2 in addition to the central control unit 201.

The display unit 203 is equipped, for example, with an LCD to display a variety of information in a display area under the control of the CPU of the central control unit 201. Specifically, for example, the display unit 203 displays, in the display area, an application screen (for example, a display screen for a live view image, a remote control screen, or the like) according to an image signal output from the display control unit 204.

The display control unit 204 generates an application screen based on the execution of each of the various application programs (for example, a live view image displaying program, a remote control program, and the like, which are not illustrated) by the CPU of the central control unit 201, and outputs, to the display unit 203, an image signal corresponding to the generated application screen.

The recording medium control unit 205 includes a recording medium 205a in a removable manner to control data reading from a loaded recording medium 205a and data writing to the recording medium 205a.

In other words, for example, the recording medium control unit 205 records, in a predetermined recording area of the recording medium 205a, image data on an acquired still image or video captured by and transmitted from an imaging apparatus 1 through wireless communication.

The recording medium 205a is, for example, a nonvolatile memory (flash memory) or the like.

The operation input unit 206 is used to input various instructions to the imaging control apparatus 2.

Specifically, for example, the operation input unit 206 includes a power button for power on/off of the body of the imaging control apparatus 2, and up, down, right, and left cursor buttons and an OK button related to a selection instruction about a mode or a function (all of which are not illustrated).

Then, when any of various buttons is operated by a user, the operation input unit 206 outputs, to the central control unit 201, an operation instruction corresponding to the operated button. The central control unit 201 causes each unit to perform predetermined operation (for example, synchronous communication operation or the like) according to the input operation instruction output from the operation input unit 206.

The operation input unit 206 may have a touch panel provided integrally with the display unit 203 to output, to the central control unit 201, an operation instruction corresponding to a predetermined operation based on the predetermined operation by the user on the touch panel.

The wireless control unit 207 performs communication control with external apparatuses (for example, the imaging apparatuses 1 and the like) connected through a predetermined wireless communication line.

In other words, the wireless control unit 207 has substantially the same configuration as the wireless control unit 108 of the above-mentioned imaging apparatus 1 to send/receive data through synchronous type wireless communication (for example, Bluetooth or the like). For example, the wireless control unit 207 is equipped with a control module M to perform synchronous type wireless communication based on the Bluetooth communication standards with the external apparatuses through a communication antenna 207a.

The configuration of the control module M of the wireless control unit 207 will be described below (see FIG. 4).

Referring next to FIG. 4, the control module M of the wireless control unit 108, 207 will be described.

FIG. 4 is a block diagram illustrating a schematic configuration of the control module M.

The control module M included in the wireless control unit 108 of the imaging apparatus 1, and the control module M included in the wireless control unit 207 of the imaging control apparatus 2 are substantially the same in configuration, but different in operation content depending on whether the control module M is included in the imaging control apparatus 2 as a master in the synchronous type wireless communication or the imaging apparatus 1 as a slave.

As illustrated in FIG. 4, the control module M is equipped with a synchronous communication unit M1, a synchronous communication control unit M2, a broadcast transmission unit M3, and a broadcast reception unit M4. The synchronous communication unit (synchronous communication means) M1 performs synchronous type wireless communication with the external apparatuses.

In other words, the synchronous communication unit M1 performs synchronous type wireless communication to send/receive data in a communication synchronized state where a communication clock of a communication partner and an own communication clock are synchronized. This synchronous type wireless communication is to put three or more apparatuses into the communication synchronized state at the same time. For example, in the case of the synchronous type wireless communication based on the Bluetooth communication standards, at most eight apparatuses form a piconet in which the apparatuses can participate.

The synchronous communication unit M1 of the control module M included in the imaging control apparatus 2 as the master in the synchronous type wireless communication transmits, in a constant cycle of radio waves, a highly accurate reference clock generated, for example, by a temperature-compensated crystal oscillator (not illustrated) under the control of the synchronous communication control unit M2. The synchronous communication unit M1 of the imaging control apparatus 2 as the master generates, from the own reference clock, an own communication clock synchronized with the reference clock at every predetermined interval (for example, 250 ms or the like).

Further, the synchronous communication unit M1 of the control module M included in each of the plural imaging apparatuses 1, . . . as the slave in the synchronous type wireless communication performs the synchronous type wireless communication with the imaging control apparatus 2 configured to control synchronous shooting by these plural imaging apparatuses 1, . . . . Specifically, the synchronous communication unit M1 of each of the plural imaging apparatuses 1, . . . receives the reference clock transmitted from the synchronous communication unit M1 of the imaging control apparatus 2 through the communication antenna 108a to generate, from this reference clock, the own communication clock synchronized with the reference clock at every predetermined interval (for example, 250 ms or the like). Further, based on a user's predetermined operation on the imaging control apparatus 2 as the master, a video shooting start instruction is transmitted from the wireless control unit 207 of this imaging control apparatus 2. When this video shooting start instruction is received by the wireless control unit 108 of each of the plural imaging apparatuses 1, . . . , the synchronous communication unit M1 of the wireless control unit 108 outputs, to the central control unit 101, an interrupt signal for a video (second interrupt signal) synchronized with the communication clock in response to the reception of the video shooting start instruction.

Further, when a broadcast wireless signal transmitted from the broadcast transmission unit M3 of the imaging control apparatus 2 is received by the broadcast reception unit M4 of each of the plural imaging apparatuses 1, . . . , the synchronous communication unit M1 of the control module M included in each of the plural imaging apparatuses 1, . . . outputs, to the central control unit 101, an interrupt signal for a still image (first interrupt signal) synchronized with the transmission timing of this broadcast wireless signal in response to the reception of the broadcast wireless signal.

The synchronous communication control unit (communication control means) M2 makes a transition to the communication synchronized state to perform wireless communication with the external apparatuses through the synchronous communication unit M1.

In other words, the synchronous communication control unit M2 of the control module M included in the imaging control apparatus 2 as the master in the synchronous type wireless communication makes a transition to the communication synchronized state to perform wireless communication with the plural imaging apparatuses 1, . . . through the synchronous communication unit M1.

Further, the synchronous communication control unit M2 of the control module M included in each of the plural imaging apparatuses 1, . . . as the slave in the synchronous type wireless communication makes a transition to the communication synchronized state to perform wireless communication with the other imaging apparatuses 1 (for example, the imaging apparatuses 1B, 1C, and the like) that are to perform synchronous shooting through the synchronous communication unit M1.

Specifically, for example, in a "synchronization establishment phase," the synchronous communication control unit M2 of the imaging control apparatus 2 as the master forms a piconet in which the plural imaging apparatuses 1, . . . are slaves in the synchronous type wireless communication to transmit the reference clock from the synchronous communication unit M1 in a constant cycle of radio waves. The synchronous communication control unit M2 of each of the plural imaging apparatuses 1, . . . as the slave causes the synchronous communication unit M1 to generate, from the reference clock transmitted from the synchronous communication unit M1 of the imaging control apparatus 2, the own communication clock synchronized with the reference clock at every predetermined interval (for example, 250 ms or the like). The own communication clock is generated for all the imaging apparatuses 1, . . . , and this puts each of the apparatuses into a state where the own communication clock is phase synchronized with the communication clock of a communication partner to establish the phase synchronization of the communication clock between the imaging control apparatus 2 and each of the plural imaging apparatuses 1, . . . .

The broadcast transmission unit M3 transmits a broadcast wireless signal.

In other words, for example, based on a user's predetermined operation on the operation input unit 206, the CPU of the central control unit (instruction means) 201 in the imaging control apparatus 2 as the master in the synchronous type wireless communication outputs, to the wireless control unit 207, a signal giving an instruction on still image shooting timing at which the plural imaging apparatuses 1, . . . are synchronized. When the signal giving the instruction on the shooting timing is input, the broadcast transmission unit (broadcast transmission means) M3 of the control module M included in the wireless control unit 207 transmits, at the shooting timing instructed by this signal, a wireless signal for broadcast communication (also called simultaneous broadcast communication or broadcast) to plural (for example, three or more) imaging apparatuses 1, . . . in the communication synchronized state. At this time, the broadcast transmission unit M3 transmits the broadcast wireless signal to all the imaging apparatuses 1 in the communication synchronized state in sync with the communication clock synchronized with one another.

The broadcast reception unit M4 receives the broadcast wireless signal.

In other words, the broadcast reception unit (broadcast reception means) M4 of the control module M included in each of the plural imaging apparatuses 1, . . . as the slave in the synchronous type wireless communication receives the broadcast wireless signal transmitted to the plural imaging apparatuses 1, . . . in the communication synchronized state from the broadcast transmission unit M3 of the imaging control apparatus 2 as the master.

The wireless control unit 108 of each of the plural imaging apparatus 1, . . . outputs an interrupt signal for a still image to the central control unit 101 in response to the reception of the broadcast wireless signal. When the interrupt signal for the still image is input, the central control unit 101 outputs, to the imaging control unit 104, a control signal to perform still image shooting processing as interrupt processing.

<Communication Processing>

Referring next to FIG. 5 and FIG. 6, communication processing performed by the wireless synchronization system 100 of the embodiment will be described.

FIG. 5 is a flowchart illustrating an example of operation related to the communication processing performed by the wireless synchronization system 100. FIG. 6 is a schematic diagram for describing the communication processing.

In the communication processing to be described below, it is assumed that, when the broadcast wireless signal is received by the wireless control unit 108 of each imaging apparatus 1, predetermined requirements such as that a synchronous shooting mode is set in advance are satisfied to perform still image shooting by the first still image shooting method.

Further, in the communication processing, the imaging control apparatus 2 which controls the synchronous shooting is selected in advance and set as the master in a piconet (one communication system configured to establish communication connection among plural apparatuses at the same time in the Bluetooth communication standards). Then, plural imaging apparatuses 1, . . . participating in the synchronous shooting are selected and set as slaves in the above-mentioned piconet (i.e., a piconet in which the selected imaging control apparatus 2 becomes the master).

Note that the selection of the imaging control apparatus 2 and the imaging apparatuses 1, and the setting of the master and the slaves mentioned above are made by the user operating the imaging control apparatus 2 to control the synchronous shooting and the user of each of the imaging apparatuses 1 participating in the synchronous shooting to perform a setting operation in order to make the apparatus function as the master or each of the slaves.

In this case, when there exist two or more apparatuses (imaging control apparatuses 2) that can be masters, one of them is selected. Further, only plural imaging apparatuses 1 actually brought into the synchronous shooting are set as the slaves in the piconet, rather than setting all imaging apparatuses 1 having the function of participating in synchronous shooting as the slaves in the piconet.

The selection of the imaging control apparatus 2 and the imaging apparatuses 1, and the setting of the master and the slaves mentioned above may be automatically made, as well as each user's manual operation. For example, a user may select, as the imaging control apparatus 2, an apparatus first set in the synchronous shooting mode to set the apparatus automatically as the master, or detect imaging apparatuses 1 in a suitable state to shoot a specific subject in order to set the apparatuses automatically as the slaves.

When the piconet among the selected imaging control apparatus 2 and plural imaging apparatuses 1, . . . is formed, these apparatuses move into the communication synchronized state.

As illustrated in FIG. 5, the synchronous communication control unit M2 of the wireless control unit 207 included in the imaging control apparatus 2 first causes a highly accurate reference clock to be transmitted from the synchronous communication unit M1 through the communication antenna 207a in a constant cycle (step S1).

The synchronous communication unit M1 of the wireless control unit 108 in each of the plural imaging apparatuses 1, . . . receives, through the communication antenna 108a, the reference clock transmitted from the synchronous communication unit M1 of the imaging control apparatus 2 to generate, from this reference clock, an own communication clock synchronized with the reference clock at every predetermined interval (for example, 250 ms or the like) (step S2). In other words, the wireless control unit 108 of each imaging apparatus 1 synchronizes the cycle and timing of a communication clock, periodically generated by an own communication clock generating unit of the synchronous communication unit M1, with the reference clock of the imaging control apparatus 2.

Thus, phase synchronization between communication clocks of the imaging control apparatus 2 and the plural imaging apparatuses 1, . . . is established (step S3). In this communication synchronized state, communication data synchronized with the communication clock at given timing can be sent/received. For example, image data on a live view image or the like captured by the plural imaging apparatuses 1, . . . are wirelessly transmitted to the imaging control apparatus 2, and the display control unit 204 of the imaging control apparatus 2 performs processing for displaying the live view image or the like on the display unit 203.

This communication synchronized state is maintained while the reference clock is being transmitted periodically from the imaging control apparatus 2.

After that, based on a user's predetermined operation on the operation input unit 206, the CPU of the central control unit 201 in the imaging control apparatus 2 determines whether a signal giving an instruction on the start of video shooting is input (step S4).

Here, when determining that no signal giving the instruction on the start of video shooting is input (NO in step S4), the CPU of the central control unit 201 performs processing for determining whether the signal giving the instruction on the start of video shooting is input repeatedly at predetermined time intervals.

When determining in step S4 that the signal giving the instruction on the start of video shooting is input (YES in step S4), the CPU of the central control unit 201 outputs, to the wireless control unit 207, the signal giving the instruction on the start of video shooting, and the synchronous communication unit M1 of the wireless control unit 207 transmits a video shooting start instruction to the plural imaging apparatuses 1, . . . through the communication antenna 207a (step S5).

In each of the plural imaging apparatuses 1, . . . , when the video shooting start instruction is received by the wireless control unit 108, the wireless control unit 108 outputs, to the central control unit 101, an interrupt signal for a video synchronized with the transmission timing of this video shooting start instruction in response to the reception of the video shooting start instruction (step S6; see FIG. 6).

When the interrupt signal for the video is input to the central control unit 101, the central control unit 101 outputs, to the imaging control unit 104, a control signal to perform video shooting processing as interrupt processing, and the shooting clock synchronizing unit 104b of the imaging control unit 104 uses the own communication clock to generate an own shooting clock in order to synchronize the own shooting clock with the own communication clock (step S7). In other words, the imaging control unit 104 of each imaging apparatus 1 synchronizes, with the communication clock, the cycle and timing of the own shooting clock periodically generated by the timing generator of the imaging control unit 104.

Here, the example in which the interrupt signal for the video is output and the shooting clock is synchronized in response to the reception of the video shooting start instruction is described, but the output of the interrupt signal for the video and the synchronization of the shooting clock may be performed when the synchronization is established in step S3.

Subsequently, the second control unit 104c starts video shooting with the imaging unit 103 in response to the reception of the signal giving the instruction on the start of video shooting (step S8). Specifically, the second control unit 104c first initializes the frame number of a video frame to be shot to start video shooting, and matches the initial value of the frame number with the other imaging apparatuses 1 (for example, the imaging apparatuses 1B, 1C, and the like). After that, the second control unit 104c uses the shooting clock synchronized by the shooting clock synchronizing unit 104b with the own communication clock to shoot each video frame while counting up frame numbers in order not only to match the shooting timing of each video frame with the other imaging apparatuses 1 (for example, the imaging apparatuses 1B, 1C, and the like), but also to match, with the other imaging apparatuses 1, each frame number being counted. Thus, the video shooting with the imaging unit 103 is performed in such a state that the shooting timing and the video frame number are synchronized among all the imaging apparatuses 1.

Note that the processing for matching the frame number with the other imaging apparatuses 1 (for example, the imaging apparatuses 1B, 1C, and the like) may be performed after the start of video shooting with the imaging unit 103. In other words, even when the frame number is not matched with the other imaging apparatuses 1 at the time of initializing the frame number, if the shooting timing of each video frame is matched (synchronized), a signal for matching the frame number at certain timing after the start of shooting can be transmitted. At the time of this transmission, for example, even if there is a difference of "20" frames between the imaging apparatus 1A in which the frame number is "100" and the imaging apparatus 1B in which the frame number is "120," information on this frame number difference can be used to reassign the frame number at the time (or after completion of shooting).

After that, based on a user's predetermined operation on the operation input unit 206, the CPU of the central control unit 201 in the imaging control apparatus 2 determines whether a signal giving an instruction on still image shooting timing at which the plural imaging apparatuses 1, . . . are synchronized is input (step S9).

Here, when determining that no signal giving the instruction on the still image shooting timing is input (NO in step S9), the CPU of the central control unit 201 performs processing for determining whether the signal giving the instruction on the still image shooting timing is input repeatedly at predetermined time intervals.

In step S9, when determining that the signal giving the instruction on the still image shooting timing is input (YES in step S9), the CPU of the central control unit 201 outputs, to the wireless control unit 207, the signal giving the instruction on the still image shooting timing, and the broadcast transmission unit M3 of the wireless control unit 207 transmits, at the shooting timing instructed by this signal, a broadcast wireless signal in sync with the communication clock at which the plural imaging apparatuses 1, . . . in the communication synchronized state are synchronized with one another (step S10). This broadcast wireless signal is transmitted without specifying any specific transmission partner so that all the apparatuses belonging to the same piconet will receive the same broadcast wireless signal at the same time. This will improve the simultaneity of notice timing, compared with a case where the wireless signal is transmitted individually to each of the plural apparatuses (even if plural wireless signals are transmitted at nearly simultaneous timings).

In each of the plural imaging apparatuses 1, . . . , when the broadcast wireless signal is received by the wireless control unit 108, the wireless control unit 108 outputs, to the central control unit 101, an interrupt signal for a still image synchronized with the transmission timing of this broadcast wireless signal in response to the reception of the broadcast wireless signal (step S11; see FIG. 6).

When the interrupt signal for the still image is input to the central control unit 101, the central control unit 101 outputs, to the imaging control unit 104, a control signal to perform still image shooting processing as interrupt processing, and the first control unit 104*a* of the imaging control unit 104 causes the imaging unit 103 to shoot the still image (step S12). Thus, the still image shooting with the imaging unit 103 is performed in such a state that all the imaging apparatuses 1 are synchronized.

After that, based on a user's predetermined operation on the operation input unit 206, the CPU of the central control unit 201 in the imaging control apparatus 2 determines whether a signal giving an instruction on the end of video shooting is input (step S13).

Here, when determining that no signal giving the instruction on the end of video shooting is input (NO in step S13), the CPU of the central control unit 201 returns the processing to step S9 to determine whether the signal giving the instruction on still image shooting timing is input.

When determining in step S13 that the signal giving the instruction on the end of video shooting is input (YES in step S13), the CPU of the central control unit 201 outputs, to the wireless control unit 207, the signal giving the instruction on the end of video shooting, and the synchronous communication unit M1 of the wireless control unit 207 transmits a video shooting end instruction to the plural imaging apparatuses 1, . . . through the communication antenna 207*a* (step S14).

In each of the plural imaging apparatuses 1, . . . , when the video shooting end instruction is received by the wireless control unit 108, the wireless control unit 108 outputs, to the central control unit 101, an interrupt signal for a video synchronized with the transmission timing of this video shooting end instruction in response to the reception of the video shooting end instruction (step S15).

When the interrupt signal for the video is input to the central control unit 101, the central control unit 101 outputs, to the imaging control unit 104, a control signal to perform video shooting processing as interrupt processing, and the second control unit 104*c* of the imaging control unit 104 ends the video shooting with the imaging unit 103 (step S16).

As described above, according to the wireless synchronization system 100 of the embodiment, the plural imaging apparatuses 1, . . . and the imaging control apparatus 2 perform synchronous type wireless communication (for example, synchronous type wireless communication based on the Bluetooth communication standards) to send/receive data in a communication synchronized state where a communication clock of a communication partner and an own communication clock are synchronized, and when shooting timing at which plural imaging apparatuses 1, . . . are synchronized is instructed, the imaging control apparatus 2 transmits, at the instructed shooting timing, a broadcast wireless signal to the plural imaging apparatuses 1, . . . in the communication synchronized state to cause the plural imaging apparatuses 1, . . . to perform synchronous shooting at the timing of receiving the broadcast wireless signal. Therefore, the shooting timings of the plural imaging apparatuses 1, . . . can be synchronized without the need to use a ring buffer or RTC time information like in the conventional techniques. Thus, synchronous shooting can be performed using the synchronous type wireless communication more effectively.

Further, still image shooting may be performed by the first still image shooting method by which, when the broadcast wireless signal is received, the still image shooting is performed immediately as being instructed on the still image shooting irrespective of the content of this broadcast data on condition that the plural imaging apparatuses 1, . . . satisfy predetermined requirements, for example. In this case, the shooting timings of the plural imaging apparatuses 1, . . . can be synchronized with higher accuracy, and hence synchronous shooting of a still image can be performed with higher accuracy.

On the other hand, still image shooting may be performed by the second still image shooting method by which, when the broadcast wireless signal is received, each of the plural imaging apparatuses 1, . . . determines whether the content of this broadcast data is to give an instruction on still image shooting, and if the content is to give the instruction on the still image shooting, the still image shooting will be performed. In this case, for example, not only can complicated settings done in advance to satisfy predetermined requirements be made unnecessary, but also the wiring of the control module M and the like can be simplified to reduce costs.

Further, a user can select either one of the first still image shooting method and the second still image shooting method mentioned above to perform still image shooting. In other words, the user can select still image shooting by a desired method depending, for example, on whether the user wants to perform synchronous shooting with high accuracy, whether the user wants to make complicated settings unnecessary, or the like. This can improve convenience.

Further, since each of the plural imaging apparatuses 1, . . . synchronizes an own shooting clock with an own communication clock synchronous with the other imaging apparatuses 1 to cause the imaging unit 103 to perform shooting in sync with this own shooting clock, synchronous shooting can be performed at timing different from that of shooting based on the broadcast wireless signal. For example, the frame number of each of frame images that constitute a video is identified by counting up shooting clocks so that not only can video shooting be performed by matching the frame number of the video with the other imaging apparatuses 1 to perform video shooting, but also still image shooting can be performed during this video shooting based on the reception of the broadcast wireless signal. Thus, two shooting tasks of a video and a still image different in shooting timing can be performed on the plural imaging apparatuses 1, . . . , respectively, in sync with one another.

Further, since a reference clock is transmitted in a constant cycle of radio waves from the imaging control apparatus 2 as the master in the synchronous type wireless communication, and the plural imaging apparatuses 1, . . . as the slaves in the synchronous type wireless communication receive the transmitted reference clock to synchronize each own communication clock with the reference clock, the imaging control apparatus 2 as the master and each of the plural imaging apparatuses 1, . . . as the slave can synchronize each other's communication clocks.

When the broadcast wireless signal transmitted from the imaging control apparatus 2 is received by the wireless control unit 108, the wireless control unit 108 outputs an interrupt signal for a still image synchronized with the transmission timing of this broadcast wireless signal, and the CPU of the central control unit 101 performs still image shooting processing as interrupt processing based on this interrupt signal for the still image. Thus, using the interrupt signal for the still image, the still image shooting timings of the plural imaging apparatus 1, . . . can be synchronized with high accuracy.

Further, when the reference clock transmitted from the imaging control apparatus 2 is received by the wireless control unit 108, the wireless control unit 108 generates a communication clock synchronized with this reference clock and outputs an interrupt signal for a video synchronized with the communication clock to cause the CPU of the central control unit 101 to perform video shooting processing as interrupt processing based on this interrupt signal for the video. Thus, using the interrupt signal for the video, the video shooting timings of the plural imaging apparatuses 1, . . . can be synchronized with high accuracy.

In addition, for example, in the case of synchronous type wireless communication based on the Bluetooth communication standards, three or more apparatuses (for example, plural imaging apparatuses 1, . . . , the imaging control apparatus 2, and the like) can be put into the communication synchronized state at the same time. Then, the imaging control apparatus 2 transmits a broadcast wireless signal to all the three or more imaging apparatuses 1 in the communication synchronized state in synch with a communication clock synchronized with one another so that the shooting timings of the plural imaging apparatus 1, . . . can be synchronized based on the broadcast wireless signal. Thus, synchronous shooting can be performed using the synchronous type wireless communication more effectively.

Note that the present invention is not limited to the above embodiment, and various improvements and design changes can be made without departing from the spirit of the present invention.

For example, the imaging control apparatus 2 configured to control the plural imaging apparatuses 1, . . . is provided, but this is just an example and the configuration is not limited thereto. For example, the wireless synchronization system 100 may be composed of only the plural imaging apparatuses 1, . . . , and among these plural imaging apparatuses 1, . . . , any one of the imaging apparatuses 1 (for example, the imaging apparatus 1A or the like) may also function as the imaging control apparatus. In other words, since the control module M of the wireless control unit 108 is substantially the same in configuration as that provided in the imaging control apparatus, the dedicated imaging control apparatus 2 does not always have to be provided.

In the above embodiment, the interrupt signal for a still image is exemplified as a first interrupt signal and the interrupt signal for a video is exemplified as a second interrupt signal, but this is just an example and can be changed appropriately and arbitrarily without being limited to this example. For example, the contents of the first interrupt signal and the second interrupt signal may be opposite to each other, and interval shooting for shooting plural still images at every predetermined time interval may be performed instead of video shooting.

Further, the above configurations of the imaging apparatuses 1, . . . and the imaging control apparatus 2 are just examples and not limited to these examples. Each configuration may be any other configuration as long as the apparatuses can perform synchronous type wireless communication in which a communication clock of a communication partner and an own communication clock are synchronized.

In addition, in the above embodiment, the functions as the communication control means, the broadcast reception means, and the shooting control means may be implemented in such a manner that the CPU of the central control unit 101 in the imaging apparatus 1 executes a predetermined program or the like.

In other words, a program including a communication control processing routine, a broadcast reception processing routine, and a shooting control processing routine is recorded in a program memory (not illustrated) configured to record the program. Then, the communication control processing routine may cause the CPU of the central control unit 101 to function as means to make a transition to the communication synchronized state in order to perform the synchronous type wireless communication with other imaging apparatuses that are to perform synchronous shooting. The broadcast reception processing routine may also cause the CPU of the central control unit 101 to function as means to receive a broadcast wireless signal transmitted to plural imaging apparatuses 1, . . . in the communication synchronized state. Further, the shooting control processing routine may cause the CPU of the central control unit 101 to function as means to perform shooting at timing of receiving the broadcast wireless signal.

Similarly, the functions as the communication control means, the instruction means, and the broadcast transmission means may also be implemented in such a manner that the CPU of the central control unit 201 in the imaging control apparatus 2 executes a predetermined program or the like.

In other words, a program including a communication control processing routine, an instruction processing routine, and a broadcast transmission processing routine is recorded in a program memory (not illustrated) configured to record the program. Then, the communication control processing routine may cause the CPU of the central control unit 201 to function as means to make a transition to the communication synchronized state in order to perform the synchronous type wireless communication with plural imaging apparatuses. The instruction processing routine may also cause the CPU of the central control unit 201 to function as means to give an instruction on shooting timing at which the plural imaging apparatuses 1, . . . are synchronized. Further, the broadcast transmission processing routine may cause the CPU of the central control unit 201 to function as means to transmit, at the instructed shooting timing, a broadcast wireless signal to the plural imaging apparatuses 1, . . . in the communication synchronized state.

A nonvolatile memory such as a flash memory or a portable recording medium such as a CD-ROM, as well as a ROM, a hard disk, or the like, can be applied as a computer-readable medium with a program stored thereon to execute each of the above processes. As a medium providing program data through a predetermined communication line, carrier waves are also applied.

What is claimed is:

1. An imaging apparatus having a synchronous type wireless communication function, comprising:
    an imaging unit including an image sensor;
    a control unit including a processor; and
    a wireless communication unit including a wireless circuit,
    wherein:
    the wireless communication unit:
        performs synchronous type wireless communication to send/receive data in a communication synchronized state in which a communication clock of a communication partner and an own communication clock are synchronized, and
        receives a broadcast wireless signal transmitted simultaneously to a plurality of imaging apparatuses in the communication synchronized state, and the control unit:
        makes a transition to the communication synchronized state to cause the wireless communication unit to perform wireless communication with other imaging apparatuses that are to perform synchronous shooting, and
        performs first shooting control to selectively perform shooting by a first shooting method that causes the imaging unit to perform shooting immediately at a timing when the broadcast wireless signal is received by the wireless communication unit, irrespective of a content of broadcast data of the broadcast wireless signal.

2. The imaging apparatus according to claim 1, wherein when the broadcast wireless signal is received by the wireless communication unit in the first shooting control, the control unit performs shooting by the first shooting method on condition that predetermined requirements are satisfied.

3. The imaging apparatus according to claim 1, wherein when the broadcast wireless signal is received by the wireless communication unit in the first shooting control, the control unit selectively performs shooting by a second shooting method in which the control unit determines whether the content of the broadcast data gives an instruction on shooting and performs shooting when it is determined that the content of the broadcast data gives the instruction on shooting.

4. The imaging apparatus according to claim 1 wherein when the broadcast wireless signal is received by the wireless communication unit in the first shooting control, the control unit selectively performs shooting by either one method selected from (i) the first shooting method to perform shooting immediately at the timing when the broadcast wireless signal is received by the wireless communication unit, irrespective of the content of the broadcast data, and (ii) a second shooting method in which the control unit determines whether the content of the broadcast data gives an instruction on shooting and performs shooting when it is determined that the content of the broadcast data gives the instruction on shooting.

5. The imaging apparatus according to claim 1, wherein the control unit:
    causes the wireless communication unit to perform synchronous type wireless communication in order to synchronize an own shooting clock with an own communication clock using the own communication clock synchronous with the other imaging apparatuses, and
    performs second shooting control to cause the imaging unit to perform shooting in sync with the synchronized own shooting clock.

6. The imaging apparatus according to claim 5, wherein the first shooting control controls still image shooting, and the second shooting control controls video shooting.

7. The imaging apparatus according to claim 6, wherein the first shooting control causes still image shooting during video shooting by the second shooting control.

8. The imaging apparatus according to claim 6, wherein:
    the second shooting control identifies a frame number of each of frame images that constitute a video based on a count of the shooting clock, and
    the wireless communication unit transmits a signal giving an instruction on timing of matching the frame number of the video with the other imaging apparatuses.

9. The imaging apparatus according to claim 1, wherein:
    an own machine functions as the imaging apparatus or an imaging control apparatus,
    the wireless communication unit performs the synchronous type wireless communication with the imaging control apparatus configured to control synchronous shooting by the plurality of imaging apparatuses,
    when the own machine functions as the imaging control apparatus, the own machine becomes a master in the synchronous type wireless communication to transmit a reference clock in a constant cycle of radio waves, and
    when the own machine functions as the imaging apparatus, the own machine becomes a slave in the synchronous type wireless communication to receive the reference clock transmitted from the imaging control apparatus and synchronize the own communication clock with the reference clock.

10. The imaging apparatus according to claim 9, wherein:
    when the broadcast wireless signal transmitted from the imaging control apparatus is received by the wireless communication unit, a first interrupt signal synchronous with a transmission timing of the broadcast wireless signal is output, and
    when the first interrupt signal output from the wireless communication unit is input, still image shooting processing is performed as interrupt processing based on this first interrupt signal.

11. The imaging apparatus according to claim 10, wherein:
    the wireless communication unit further receives the reference clock transmitted from the imaging control apparatus to generate a communication clock synchronous with the reference clock and output a second interrupt signal synchronous with the communication clock, and
    when the second interrupt signal output from the wireless communication unit is input, video shooting processing is performed as interrupt processing based on the second interrupt signal.

12. The imaging apparatus according to claim 9, wherein among the plurality of imaging apparatuses including the own machine, any one of the imaging apparatuses serves also as the imaging control apparatus.

13. The imaging apparatus according to claim 1, wherein the wireless communication unit performs synchronous type wireless communication based on Bluetooth communication standards.

14. An imaging control apparatus having a synchronous type wireless communication function, comprising:
   a control unit including a processor; and
   a wireless communication unit including a control circuit to perform wireless communication,
   wherein:
   the wireless communication unit performs synchronous type wireless communication to send/receive data in a communication synchronized state in which a communication clock of a communication partner and an own communication clock are synchronized, and
   the control unit:
      makes a transition to the communication synchronized state to cause the wireless communication unit to perform wireless communication with a plurality of imaging apparatuses,
      receives an instruction on synchronous shooting timing transmitted from any of the plurality of imaging apparatuses as an apparatus different from the imaging control apparatus, and
      transmits a broadcast wireless signal to the plurality of imaging apparatuses in the communication synchronized state at the instructed shooting timing.

15. The imaging control apparatus according to claim 14, wherein:
   the synchronous type wireless communication puts three or more apparatuses into the communication synchronized state simultaneously, and
   the wireless communication unit transmits the broadcast wireless signal to all the apparatuses in the communication synchronized state.

16. The imaging control apparatus according to claim 15, wherein:
   the control unit makes a transition to the communication synchronized state to cause the wireless communication unit to perform wireless communication with three or more imaging apparatuses that are to perform synchronous shooting, and
   the wireless communication unit transmits the broadcast wireless signal to the three or more imaging apparatuses in the communication synchronized state.

17. The imaging control apparatus according to claim 15, wherein the wireless communication unit transmits, to all the apparatuses in the communication synchronized state, the broadcast wireless signal in sync with a communication clock synchronized with one another.

18. The imaging control apparatus according to claim 14, wherein the wireless communication unit performs synchronous type wireless communication based on Bluetooth communication standards.

19. An imaging method using an imaging apparatus configured to perform synchronous type wireless communication to send/receive data in a communication synchronized state in which a communication clock of a communication partner and an own communication clock are synchronized, the method comprising:
   making a transition to the communication synchronized state to perform the synchronous type wireless communication with other imaging apparatuses that are to perform synchronous shooting;
   receiving a broadcast wireless signal transmitted to a plurality of imaging apparatuses in the communication synchronized state; and
   performing shooting immediately at a timing when the broadcast wireless signal is received, irrespective of a content of broadcast data of the broadcast wireless signal.

20. An imaging control method using an imaging control apparatus configured to perform synchronous type wireless communication to send/receive data in a communication synchronized state in which a communication clock of a communication partner and an own communication clock are synchronized, the method comprising:
   making a transition to the communication synchronized state to perform the synchronous type wireless communication with a plurality of imaging apparatuses;
   receiving an instruction on synchronous shooting timing transmitted from any of the plurality of imaging apparatuses as an apparatus different from the imaging control apparatus; and
   transmitting, at the shooting timing when the instruction is received, a broadcast wireless signal to the plurality of imaging apparatuses in the communication synchronized state.

21. A non-transitory recording medium with a program recorded thereon, the program causing a computer of an imaging apparatus, configured to perform synchronous type wireless communication to send/receive data in a communication synchronized state in which a communication clock of a communication partner and an own communication clock are synchronized, to function as units comprising:
   a communication control unit configured to make a transition to the communication synchronized state to perform the synchronous type wireless communication with other imaging apparatuses that are to perform synchronous shooting;
   a broadcast reception unit configured to receive a broadcast wireless signal transmitted to a plurality of imaging apparatuses in the communication synchronized state; and
   a shooting control unit configured to perform shooting immediately at a timing when the broadcast wireless signal is received by the broadcast reception unit, irrespective of a content of broadcast data of the broadcast wireless signal.

22. A non-transitory recording medium with a program recorded thereon, the program causing a computer of an imaging control apparatus, configured to perform synchronous type wireless communication to send/receive data in a communication synchronized state in which a communication clock of a communication partner and an own communication clock are synchronized, to function as units comprising:
   a communication control unit configured to make a transition to the communication synchronized state to perform the synchronous type wireless communication with a plurality of imaging apparatuses;
   an instruction reception unit configured to receive an instruction on synchronous shooting timing transmitted from any of the plurality of imaging apparatuses as an apparatus different from the imaging control apparatus; and
   a broadcast transmission unit configured to transmit a broadcast wireless signal to the plurality of imaging apparatuses in the communication synchronized state at the shooting timing when the instruction is received.

* * * * *